(12) United States Patent
Takata

(10) Patent No.: US 11,114,676 B2
(45) Date of Patent: Sep. 7, 2021

(54) FUEL CELL SEPARATOR

(71) Applicant: TOYOTA JIDOSHA KABUSHIKI KAISHA, Toyota (JP)

(72) Inventor: Satoshi Takata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 16/364,308

(22) Filed: Mar. 26, 2019

(65) Prior Publication Data

US 2019/0326610 A1  Oct. 24, 2019

(30) Foreign Application Priority Data

Apr. 23, 2018 (JP) .............................. JP2018-082270

(51) Int. Cl.
| | | |
|---|---|---|
| H01M 8/0217 | (2016.01) | |
| H01M 8/0206 | (2016.01) | |
| H01M 8/0223 | (2016.01) | |
| H01M 8/10 | (2016.01) | |

(52) U.S. Cl.
CPC ....... *H01M 8/0217* (2013.01); *H01M 8/0206* (2013.01); *H01M 8/0223* (2013.01); *H01M 8/10* (2013.01)

(58) Field of Classification Search
CPC . H01M 8/0223; H01M 8/0206; H01M 8/0217
See application file for complete search history.

(56) References Cited

U.S. PATENT DOCUMENTS

2006/0134501 A1* 6/2006 Lee ..................... H01M 8/0228
429/457
2018/0053948 A1* 2/2018 Tarutani ................ C22C 38/005

FOREIGN PATENT DOCUMENTS

| JP | 2007-026868 A | | 2/2007 |
| JP | 2017-199535 A | | 11/2017 |
| KR | 20070024124 A | * | 3/2007 |

* cited by examiner

*Primary Examiner* — Jonathan G Jelsma
(74) *Attorney, Agent, or Firm* — Sughrue Mion, PLLC

(57) ABSTRACT

A fuel cell separator having high corrosion resistance and electrical conductivity is provided. This fuel cell separator includes, on a substrate, a composite film containing an antimony-doped tin oxide and a tin-doped indium oxide, in which an element ratio of tin to indium (Sn/In) in the composite film is 1.4 or smaller.

2 Claims, 3 Drawing Sheets

FUEL CELL SEPARATOR

CROSS REFERENCE TO RELATED APPLICATIONS

This application is based upon and claims the benefit of priority from Japanese patent application No. 2018-82270, filed on Apr. 23, 2018, the disclosure of which is incorporated herein in its entirety by reference.

BACKGROUND

The present disclosure relates to a fuel cell separator.

A separator used for a fuel cell that has a concavo-convex shape formed by press working or the like has been known. This separator is arranged on a gas diffusion layer of a membrane electrode assembly, which forms a unit cell. A surface of this separator on the side of the gas diffusion layer forms a gas surface that forms a flow path of reactive gas or the like and another surface thereof forms a cooling surface that forms a flow path of cooling water or the like. Further, this separator typically has electrical conductivity in order to draw electric power obtained from the unit cell.

Further, it is required that the separator have corrosion resistance against hydrofluoric acid-based acid generated in the membrane electrode assembly.

Japanese Unexamined Patent Application Publication No. 2007-26868 discloses a fuel cell in which a current-collecting part is provided in a stacked structure of an electrode surface of a solid electrolyte membrane and a separator, a coating film made of indium oxide being formed in a contact part between the current-collecting part of the separator and the electrode surface.

SUMMARY

The present inventor has studied use of an antimony-doped tin oxide (ATO) in order to reduce the amount of usage of indium, which is a rare metal. However, the ATO film has electrical conductivity lower than that of the indium oxide film. Further, the ATO film has low corrosion resistance, and a substrate component may be attached onto the ATO film by permeated acid or the like, which may cause electrical conductivity to be further reduced.

The present disclosure has been made in view of the aforementioned circumstances and aims to provide a fuel cell separator with high corrosion resistance and high electrical conductivity.

A first fuel cell separator according to this embodiment includes, on a substrate, a composite film containing an antimony-doped tin oxide and a tin-doped indium oxide, in which an element ratio of tin to indium (Sn/In) in the composite film is 1.4 or smaller.

A second fuel cell separator according to this embodiment includes: on a substrate, a composite film containing an antimony-doped tin oxide and a tin-doped indium oxide; and a tin-doped indium oxide film, in this order, in which an element ratio of tin to indium (Sn/In) in the composite film is 1.4 or smaller.

A third fuel cell separator according to this embodiment includes, on a substrate, an antimony-doped tin oxide film and a tin-doped indium oxide film in this order.

According to the present disclosure, it is possible to provide a fuel cell separator having high corrosion resistance and electrical conductivity.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
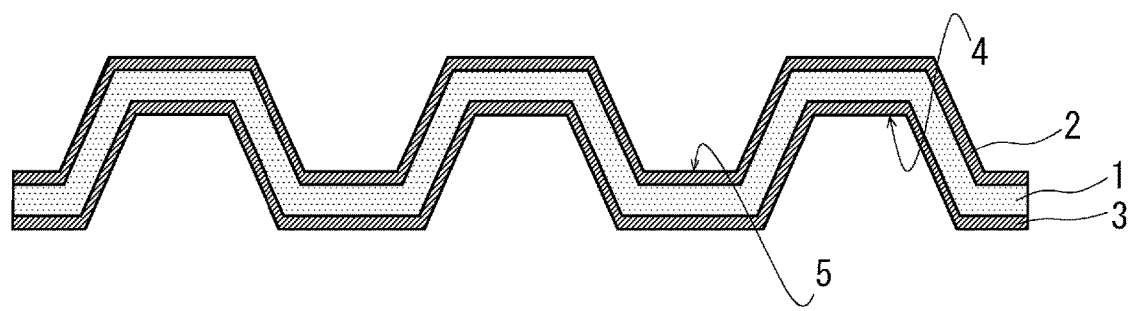
FIG. 1 is a schematic cross-sectional view showing one example of a fuel cell separator according to this embodiment.

Referring to FIG. 1, an outline of a fuel cell separator according to this embodiment will be explained. A fuel cell separator 10 as shown in the example of FIG. 1 includes coating films (2 and 3) on a substrate 1.

Figure 2:
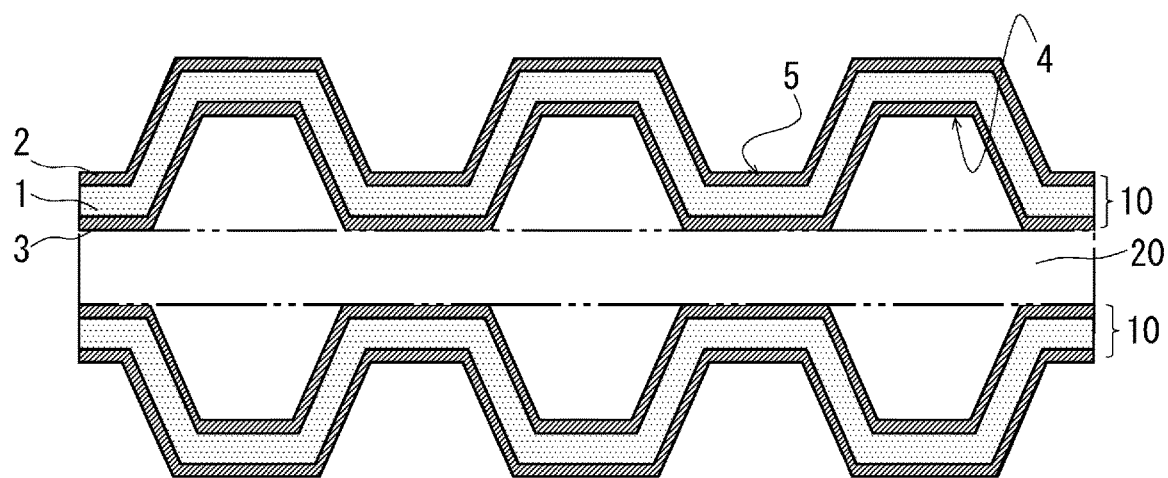
FIG. 2 is a schematic cross-sectional view showing one example of a usage state of the fuel cell separator according to this embodiment.

The fuel cell separator 10 according to this embodiment includes, as shown in the example of FIG. 2, gas surfaces 4 disposed in a gas diffusion layer included in a membrane electrode assembly 20 in such a way that the gas surfaces 4 are opposed to each other, which forms a gas flow path, and has electrical conductivity to draw electric power obtained from the membrane electrode assembly 20.

Figure 3:
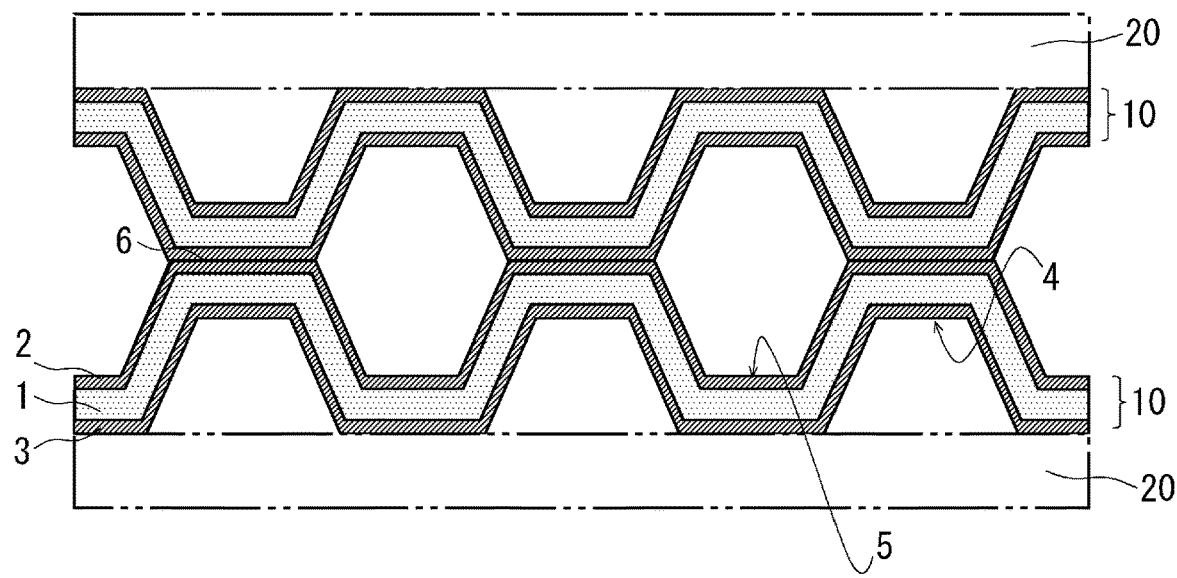
FIG. 3 is a schematic cross-sectional view showing one example of a contact of fuel cell separators.

The fuel cell typically has a stack structure in which the membrane electrode assemblies 20 are stacked on one another in order to obtain a necessary voltage. When the membrane electrode assemblies 20 are stacked on one another as shown in the example of FIG. 3, at least some of cooling surfaces 5 come in contact with each other in the fuel cell separator 10, whereby a contact part 6 is formed.

In a first fuel cell separator according to this embodiment, the coating films (2 and 3) form a composite film that contains an antimony-doped tin oxide and a tin-doped indium oxide, and the element ratio of tin to indium (Sn/In) in the composite film is 1.4 or smaller. The first fuel cell separator uses this composite film, whereby it is possible to obtain a separator having high electrical conductivity and corrosion resistance while reducing the amount of usage of indium.

In a second fuel cell separator according to this embodiment, the coating films (2 and 3) form a stacked film further including an ITO film on the composite film in the first fuel cell separator. Since the coating films form a stacked film including an ITO film on the outermost surface thereof, it is possible to obtain a separator having higher corrosion resistance while reducing the amount of usage of indium.

Further, in a third fuel cell separator according to this embodiment, the coating films (2 and 3) form a stacked film further including an ITO film on the ATO film. Since the coating films form a stacked film including an ITO film on the outermost surface thereof, it is possible to obtain a separator having high corrosion resistance while reducing the amount of usage of indium.

The material of the substrate 1 that composes the separator is not particularly limited, and can be selected as appropriate from among known materials used for a fuel cell separator. Examples thereof are a plastic material, a metallic substrate or the like. A metallic substrate is preferably used from the viewpoint of high corrosion resistance, high electrical conductivity and the like. The metal used for the metallic substrate may be, for example, iron, titanium, aluminum or an alloy such as stainless, but is not limited thereto. The metal is preferably titanium or stainless in view of corrosion resistance and is preferably stainless from the viewpoint of easy availability or the like. When stainless is used, it is preferably used after an oxidized film on the surface thereof is removed in view of electrical conductivity.

The shape of the substrate may be a desired shape in accordance with the design of the fuel cell. The shape of the separator may be, for example, the one that includes a gas surface 4 where a gas flow path can be formed on the side of the membrane electrode assembly 20 and a cooling surface 5 where a flow path of a refrigerant or the like can be formed on the surface on the opposite side of the gas surface 4.

The thickness of the substrate may be selected as appropriate to the extent that gas blocking property and electrical conductivity are secured, and may be, for example, 0.05 mm-0.2 mm, and preferably 0.1 mm.

In the first and second separators, a composite film is included on the substrate. This composite film contains ATO and ITO, and the element ratio of tin to indium (Sn/In) is 1.4 or smaller. By using ATO and ITO in this ratio, it is possible to maintain high electrical conductivity by ITO particles having high electrical conductivity while reducing the amount of use of ITO. Further, it is preferable that this composite film include 30-60% by volume of ATO in the film.

While the method of forming the aforementioned composite film is not particularly limited, it may be formed using, for example, a sintered body in which indium oxide, tin oxide, and antimony oxide are mixed in a desired ratio as a target by a sputtering method or the like. Further, the ATO film used in the third separator may use a sintered body in which tin oxide and antimony oxide are mixed in a desired ratio as a target in the above sputtering method.

While the percentage of antimony in the antimony-doped tin oxide is not particularly limited, it may be, for example, 0.2-10 atom % (atm. %).

Further, the percentage of tin in the tin-doped indium oxide is not particularly limited, it may be, for example, 0.2-10 atom %.

While the thickness of the ATO film or the composite film is not particularly limited, it is preferably about 0.1 μm from the viewpoint of electrical conductivity and corrosion resistance.

In the second and third separators, an ITO film is further included in the front layer. When the ITO film is formed, a sintered body in which indium oxide and tin oxide are mixed in a desired ratio may be used, for example, as a target in the aforementioned sputtering method.

While the thickness of the ITO film is not particularly limited, it may be about 1-10 nm, and is preferably 5 nm from the viewpoint of improving corrosion resistance while reducing the amount of usage of indium.

In this embodiment, each coating film may be formed on both surfaces of the substrate, as shown in FIG. 1, may be formed only on the side of the gas surface 4 of the substrate, or may be formed only in the contact part 6 where the separators contact each other. The coating film is preferably formed on both surfaces of the substrate in view of easiness of manufacturing, electrical conductivity, and corrosion resistance of the substrate.

EXAMPLES

Hereinafter, this embodiment will be explained in detail with reference to Examples and Comparative Examples. However, this embodiment is not limited to the following Examples.

Example 1

A stainless (SUS447) plate (thickness: 0.1 mm) was prepared as a substrate.

The substrate was placed in a vacuum chamber, argon gas was introduced therein under a vacuum condition, a voltage was applied to generate argon ions, and the substrate surface was hit, whereby the oxide film on the surface was removed.

Next, a mixed sintered body of indium oxide, tin oxide, and antimony oxide was placed in the vacuum chamber as a target, and the vacuum chamber was exhausted. Next, argon gas was introduced into the vacuum chamber as sputtering gas, a voltage was applied to make argon gas collide with the target, which caused the target atoms to be ejected and deposited on the substrate, whereby a film was formed.

The obtained film was a composite film of an antimony-doped tin oxide into which 3 atm. % of antimony was doped and tin-doped indium into which 4 atm. % of tin was doped.

By changing the proportion of each component in the target, composite films and ATO films in which the proportion of the ATO was 30, 40, 50, 60, 70, 80, and 100% by volume were formed.

Example 2

A substrate including the composite film and the ATO film obtained in the Example 1 was placed in a vacuum chamber, and a mixed sintered body of indium oxide and tin oxide was placed as a target, whereby an ITO film was formed on the composite film and the ATO film by the sputtering method similar to that in the aforementioned Example 1. The thickness of the ITO film was 5 nm.

<Anticorrosion Test>

An anticorrosion test was performed by a constant potential corrosion test in accordance with an electrochemical high temperature corrosion test method for metal materials (JIS Z2294) specified in Japanese Industrial Standards.

The substrate obtained in the aforementioned Examples 1 and 2 was immersed in a sulfuric acid aqueous solution at 80° C., and the potential was kept constant at 0.9V vs SHE (standard electrode potential) in this state. Sodium fluoride (FNa) was dissolved in the sulfuric acid aqueous solution in such a way that the fluoride ion concentration became 3000 ppm. The time for the test was set to 100 hours.

<Measurement of Contact Resistance>

A gold-plated copper plate was placed onto the surface of the substrate on the side of the antimony-doped tin oxide film before and after the anticorrosion test, a carbon paper (TGP-H-120 manufactured by Toray Industries, Inc.) was put between the substrate and the copper plate, and a voltage value between the antimony-doped tin oxide film surface and the carbon paper when a constant current was applied between the substrate and the copper plate while applying pressure of 0.98 MPa was measured, whereby a resistance value was calculated.

<Measurement of Element Ratio of Film>

Figure 4:
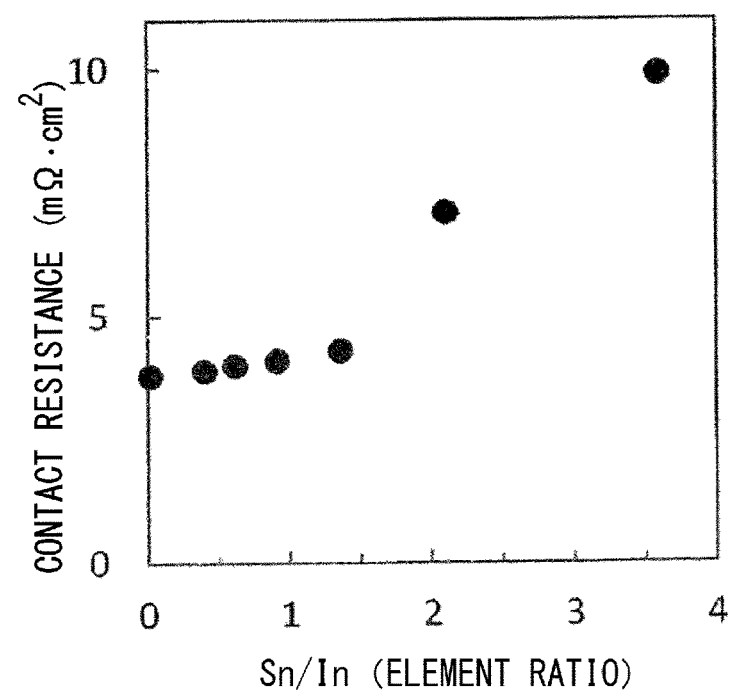
FIG. 4 is a graph showing a relation between an element ratio of tin to indium in a composite film and contact resistance before an anticorrosion test.

Measurement was performed for the composite films according to the Examples by X-ray photoelectron spectroscopy (XPS) and thus the element ratio of tin to indium (Sn/In) was calculated. FIG. 4 shows a relation between the element ratio and contact resistance after the anticorrosion test.

[Summary of Results]

Figure 6:
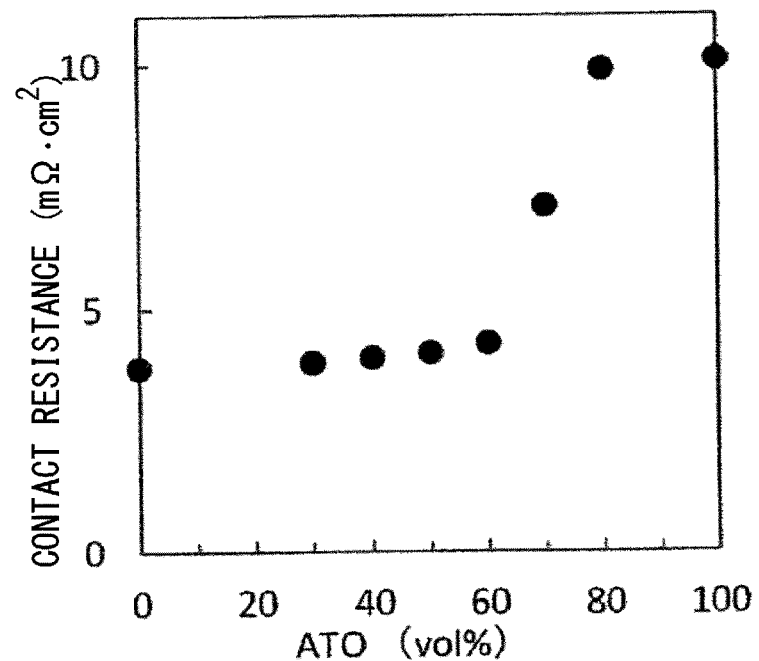
FIG. 6 is a graph showing a relation between the proportion of ATO in the composite film and contact resistance before the anticorrosion test.

FIG. 6 shows a relation between the proportion of ATO in the composite film and the contact resistance before the anticorrosion test. While the contact resistance tended to decrease when the proportion of ATO became 70% by volume or more, the reduction in the electrical conductivity was suppressed in a range in which the content rate of ATO was 60% by volume or smaller. It has thus been revealed that it is possible to obtain a separator having high electrical conductivity while reducing the amount of indium.

FIG. 4 shows a relation between the element ratio of tin to indium (Sn/In) in the composite film and the contact resistance before the anticorrosion test. As shown in FIG. 4, it has been revealed that the separator has high electrical conductivity when Sn/In is 1.4 or smaller.

Figure 5:
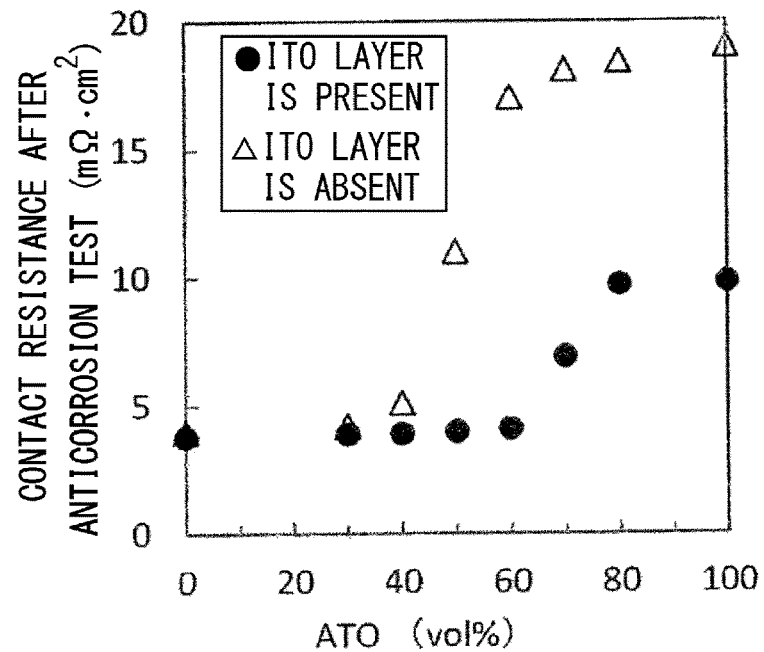
FIG. 5 is a graph showing a relation between the proportion of ATO in the composite film, the presence or the absence of an ITO film on the composite film, and contact resistance after the anticorrosion test.

Further, FIG. 5 shows a relation between the proportion of ATO in the composite film, the presence or the absence of the ITO film on the composite film, and contact resistance after the anticorrosion test. As shown in FIG. 5, it has been revealed that a separator having high corrosion resistance can be obtained by forming the ITO film on the composite film or the ATO film.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell separator comprising, on a substrate, a composite film containing an antimony-doped tin oxide (ATO) and a tin-doped indium oxide,
   wherein an element ratio of tin to indium (Sn/In) in the composite film is 1.4 or smaller, and
   the composite film includes 30-60% by volume of the ATO in the composite film.

2. A fuel cell separator comprising: on a substrate,
   a composite film containing an antimony-doped tin oxide (ATO) and a tin-doped indium oxide; and
   a tin-doped indium oxide film, in this order,
   wherein an element ratio of tin to indium (Sn/In) in the composite film is 1.4 or smaller, and
   the composite film includes 30-60% by volume of the ATO in the composite film.

* * * * *